July 21, 1936.     H. W. KIZER     2,048,454
STREAMLINED AUTOMOTIVE VEHICLE
Original Filed Nov. 24, 1933    3 Sheets-Sheet 1

Howard W. Kizer
INVENTOR

BY R. J. Dearborn
his ATTORNEY

July 21, 1936.   H. W. KIZER   2,048,454
STREAMLINED AUTOMOTIVE VEHICLE
Original Filed Nov. 24, 1933   3 Sheets-Sheet 2
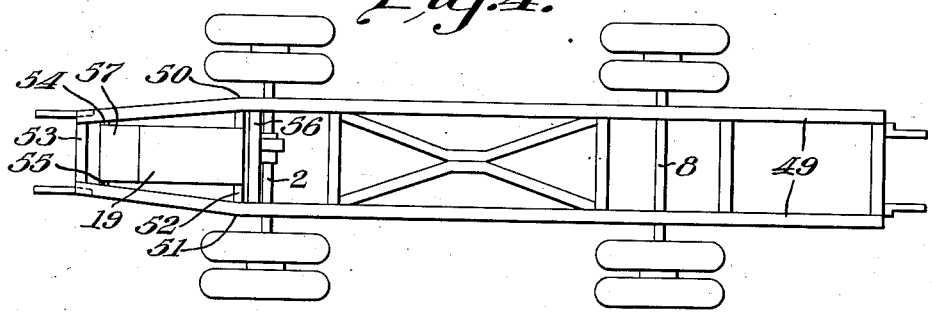
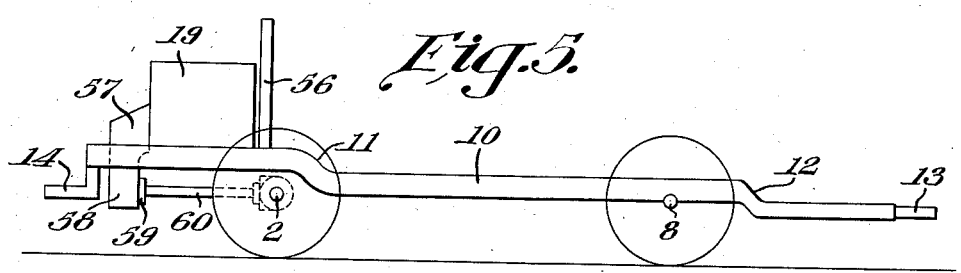
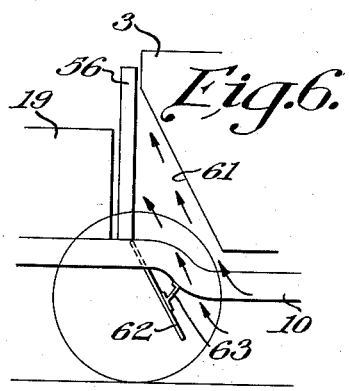
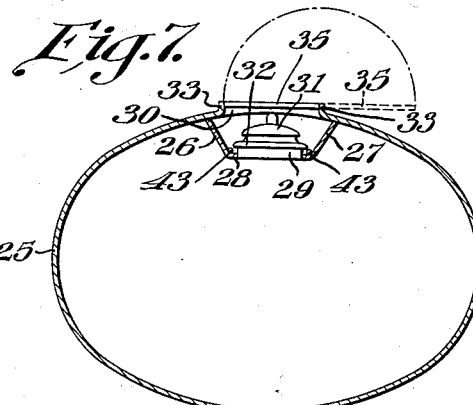
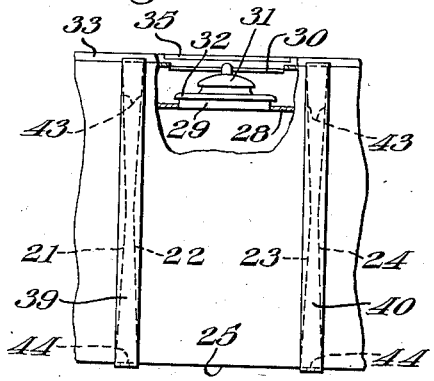
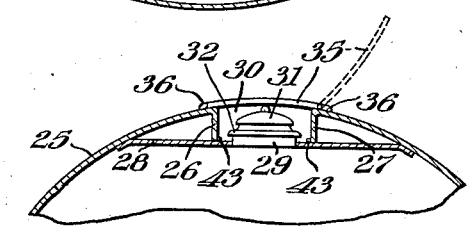
Howard W. Kizer
INVENTOR
BY R. J. Dearborn
his ATTORNEY

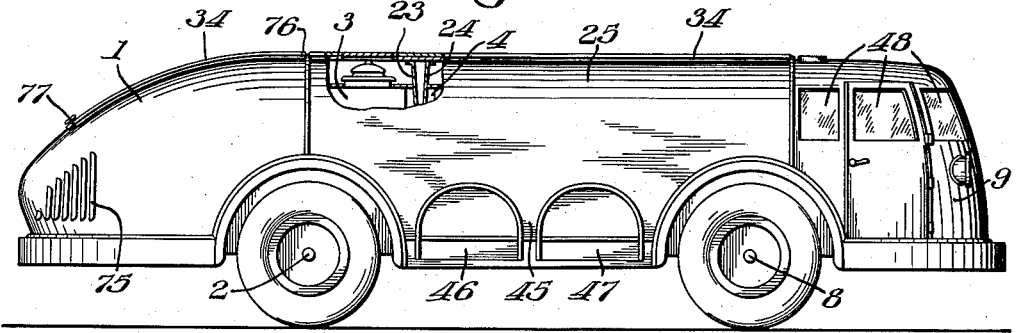
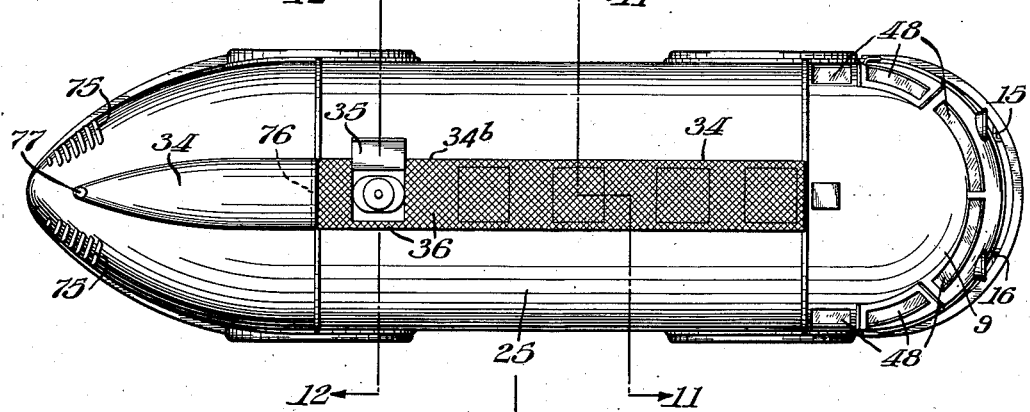
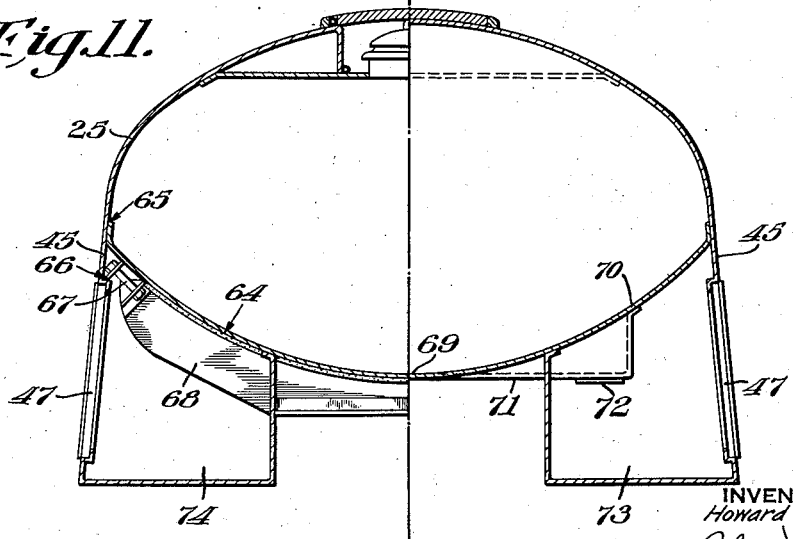

Patented July 21, 1936

2,048,454

UNITED STATES PATENT OFFICE 2,048,454

STREAMLINED AUTOMOTIVE VEHICLE

Howard W. Kizer, South Orange, N. J., assignor to The Texas Company, New York, N. Y., a corporation of Delaware Original application November 24, 1933, Serial No. 699,495. Divided and this application July 17, 1934, Serial No. 735,590

13 Claims. (Cl. 220—1)

This invention pertains to the construction of automotive road vehicles and particularly applies to the construction of stream-lined vehicles in which a self contained power unit is located at the rear of the chassis.

The object of the invention is to apply a modified stream-line to vehicles of short wheel base and more particularly to commercial vehicles such as heavy duty tank trucks.

In order to secure the desired stream-line and at the same time maintain a reasonably short wheel base this invention has been applied to that type of road vehicle in which a self contained power unit is located to the rear of the rear axle. A feature of the invention is the means by which power is conveyed from the power unit to the rear wheels. A further feature relates to the means whereby an adequate supply of air is conducted to the radiator which in this type of construction is not directly exposed.

The invention also provides means whereby the control cab may be supported at a level such that it can be readily fitted into the general stream line of the vehicle. In the type of vehicle disclosed the pay load carrying portion of the chassis may also be dropped below the axle level thus giving a high load carrying compartment without in any way interfering with the stream line or with the placing of the engine or control cab. This unique structural feature is made possible by the location of the power unit in the rear of the chassis and by the use of remote control for controlling the engine and brakes from the control cab, thus obviating the necessity for a propeller shaft and tie-rods under the central portion of the chassis.

In the application of the invention to a tank truck, structural changes in the usual type of liquid container have been provided locating the filling apparatus within the outer shell of the tank where it does not interrupt the stream-line. Means have also been provided for connecting the tank compartments to the other body units and to the chassis.

The features embodying this invention thus make possible the construction of a vehicle with a short turning radius, having a low center of gravity and in which the total load may be more equally distributed between the two axles than is customary. Such a vehicle presents a pleasing appearance, has a minimum air resistance and is easily kept clean. The low center of gravity in combination with the fact that the pay load is carried in the middle of the vehicle makes for safety, which is of particular importance when it is used as a tank truck, and the low overall height together with the fact that the floor of the load compartment may be suspended below axle level makes for ease in loading and unloading.

Other features and advantages of the invention will appear in the course of the following description.

In this specification and in the annexed drawings the invention is primarily shown embodied in an automotive tank truck, but I do not intend to thereby limit my invention to this specific application. Various other applications and modifications may suggest themselves to those skilled in the art, and it is therefore my intention that the invention be limited only by the scope of the appended claims.

In the accompanying drawings:

Figure 4 is a plan view of the chassis.

Figure 5 is a view of the chassis in side elevation.

Figure 6 illustrates the general arrangement of the radiator and air deflector, in relation to the frame, the engine and the load compartments.

Figure 7 is a lateral cross section of one of the tank compartments on the lines 7—7 of Figure 2.

Figure 8 is a longitudinal cross section of one of the tank compartments on the lines 8—8 of Figure 2.

Figure 9 is a view of a modified form of the vehicle in side elevation, with a portion of the shell cut away to show the arrangement of the individual compartments.

Figure 10 is a plan view of the modification illustrated in Figure 9.

Figure 11 is a lateral cross section on the lines 11—11 of Figure 10 and shows the method of attaching the tank to the bolsters and the arrangement of the side compartments and unloading facilities.

Figure 12 is a partial cross section of one of the modified tank compartments on the lines 12—12 of Figure 10.

The same numerical designation for corresponding parts is used throughout the specification and drawings.

Figure 1:
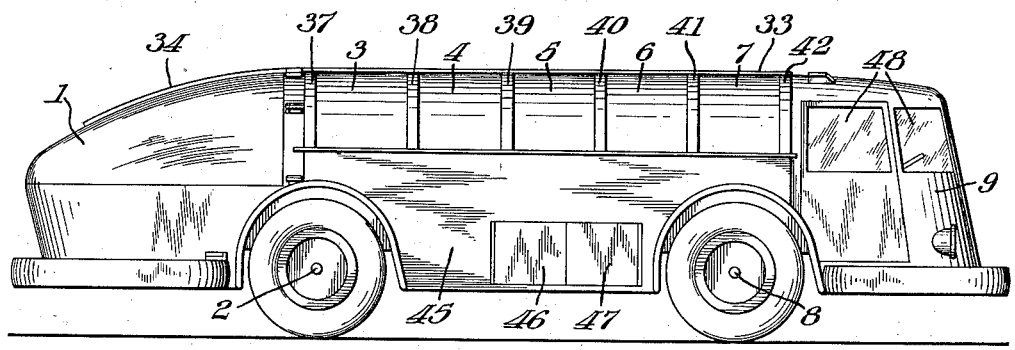
Figure 1 is a view of the vehicle in side elevation.

By reason of the enormous loads which heavy duty tank trucks are required to carry, they are usually cumbersome to handle and when the tanks or containers are carried above the wheels, as is often the case, such trucks are subject to side-sway and are notoriously unsteady. Furthermore many of the ordinary tank trucks have an extremely long turning radius and they are consequently unwieldy for handling in city streets.

In order to obviate some of the objections just recited I have designed a truck suitable for heavy duty service which will have a comparatively short wheel base. To attain a short wheel base I have placed the engine in a compartment 1 (Figs. 1 and 9) to the rear of the rear axle 2 rather than in front of the control cab 9 and have placed the pay load compartments 3–7 approximately between the two axles and the control cab 9 in front of the forward axle 8, thus distributing the total load approximately equally between the two axles. Such an arrangement gives a balanced vehicle which is both practical and at the same time pleasing to the eye.

This arrangement alone, however, would not permit of the use of satisfactory stream-lines, since a control cab having the required head room stands too high when mounted on the customary chassis, to adapt itself well to stream-lining. I have therefore not only dropped the frame 10 (Fig. 5) of the vehicle in a downwardly direction at point 11 in front of the rear axle 2 as is customary, but I have again offset it in a downwardly direction at point 12 in front of the front axle 8 to a level approximating or even below that of the axles. The forward portion of control cab 9 is mounted on such an offset frame 10 and the overall height of the cab is materially less than that of the usual tank truck cab.

The same difficulty is not encountered in connection with the engine hood 1 as the common types of self-contained power units adapted for use in automotive road vehicles are comparatively small in size and consequently, when placed at the rear of the chassis, readily lend themselves to the space afforded by a tapered hood of modified "fish-tail" design which is customary in stream-lined vehicles.

At both front and rear ends of the frame, extensions 13, 14 (Fig. 5) may be attached to support the bumper connections 15–18 (Fig. 2) or the frame itself may be reduced in size and extended for this purpose.

The steering, gear shift, clutch and brakes in the vehicle disclosed are all operated by compressed air (by one of several well known methods, the details of which do not form a part of this invention and are therefore not illustrated) and consequently there are no tie-rods or other rigid linkages passing from the control cab to the engine or from the control cab to the braking system associated with the rear wheels.

Since the engine 19 (Fig. 5) is in the rear of the vehicle and since the usual linkages from the running gear to the control cab have been eliminated, the portion of the frame between the two axles may be offset in a downwardly direction to any level compatible with adequate road clearance. While this factor is not of marked importance in so far as tank trucks are concerned, it is of value in connection with heavy duty trucks of other types since the floor of the pay load compartment may thus be placed much closer to the ground than is customary in ordinary commercial vehicles and heavy loads may consequently be more readily handled. Such a construction has the additional advantage of permitting side loading and the use of a stream-line body having doors which open to expose a relatively large portion of the load carrying space. For use in city traffic where side loading is of great advantage and where a short turning radius is desirable, such a vehicle having a loading floor at approximately curb level is of importance.

In the preferred form of the invention the load carrying containers or compartments 3–7, (Figs. 1 and 9) are formed by welding a series of double bulkheads such as bulkheads 21, 22 and 23, 24 (Figs 8 and 9) into a single metal tank 25 of suitable size, although a plurality of separate tanks may be used if desired.

In stream-lining a tank truck it is obviously desirable to remove the filling caps which normally protrude at the top of the individual containers. These have here been taken care of as shown in Figures 7, 8, 9, and 12. In Figures 7 and 8 a false top formed by walls, 26, 27 and floor 28 has been welded to the sides and ends of each of the load carrying containers or compartments 3–7 and a manhole 29 has been cut in floor 28. Directly above the manhole an aperture 30 at least equal to the manhole in size and preferably rectangular in shape has been cut in the outer surface or shell 25 of each container 3–7, thus giving access to a filling cap 31 placed in a cover 32 which is fastened over the manhole in the floor of the false top. The construction shown in Figures 9 and 12 is similar to that of Figures 7 and 8 with the exception that floor 28 is welded directly to the sides of the tank as well as to the walls 26, 27 of the false top. The cover and filling cap may be of standard design and the distance between the top of the tank and the floor of the false top will depend on the height of the unit used.

It should be noted in this connection that in view of the semi-inclosed position of the cover and the filling cap adequate air vents must be placed either in the manhole cover or in the filling cap.

Figure 2:
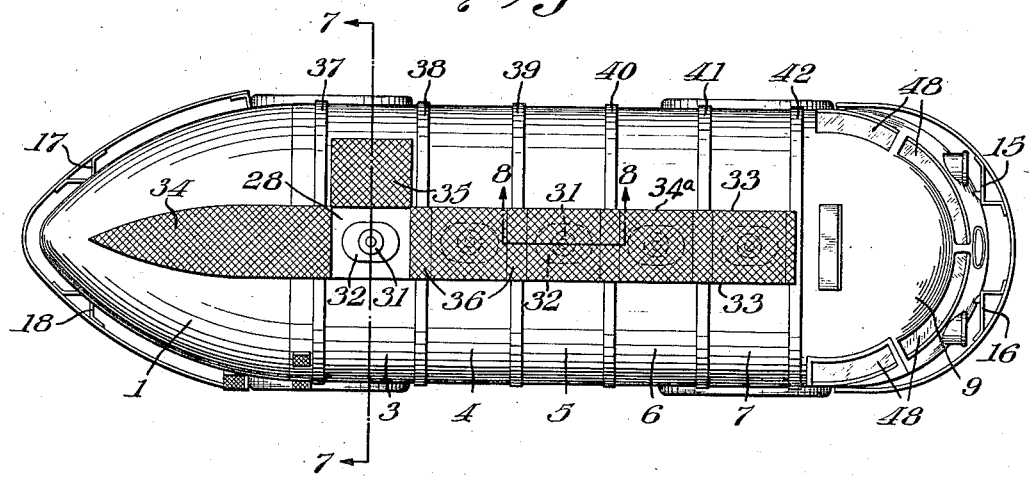
Figure 2 is a plan view of the vehicle.
Figure 3:
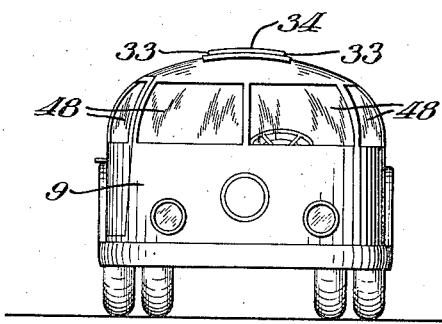
Figure 3 is a view of the vehicle in front elevation.

Two narrow strips of metal 33 (Figs. 1, 3, 7, and 8) approximately one inch high are welded along the longitudinal edges of the apertures to the shell 25 of the tank and a metal cat-walk 34, which may be either in the form of a grille-work 34a as shown in Figure 2 or of sheet metal 34b with a scored surface as shown in Figure 10, is supported on these strips which extend the full length of the tank. If preferred the cat-walk may be secured directly to the tank top (Fig. 12) or it may be set up on transverse blocks if that is found more desirable. The cat-walk is divided into sections so that there is a separate section such as 35, which is shown open in Figures 2 and 7, above each aperture or doors may be placed therein as shown in Figures 10 and 12. The sections above the apertures are hinged to one of the strips or to the fixed sections by a hinge running the full length of the section and a catch is provided on the opposite side to hold the hinged section firmly in position when shut. This arrangement gives ready access to the filling caps and manholes for loading, or cleaning and repairing the tanks. The intermediate or side sections 36 (Figs. 2 and 10) may be permanently fastened to the longitudinal strips. A section of cat-walk similar to that over the containers may be placed over the engine compartment for the sake of uniformity, as shown in Figures 2 and 10 and if desirable this may be hinged and utilized as a cover for an air vent in the top of the engine hood. The cat-walk may, if desired, be slightly curved to conform in part to the contour of the body, as shown in Figure 3.

If a single tank which has been divided into compartments is utilized, such a tank may be held in place by means of a plurality of metal straps 38–41 (Figs. 1 and 2) which pass over the tank and are fastened at either end to the customary bolsters or cradles on which it rests and which in turn are secured to the chassis. Similar straps 37 and 42 may be utilized to hold the control cab and engine compartments in spaced relation to the containers, one strap 42 being welded or otherwise secured to the adjoining peripheral edges of the control cab and the forward tank compartment and another strap 37 being welded to the adjoining peripheral edges of the engine compartment and the rear tank compartment. This type of mounting not only gives the required rigidity but has the added advantage of uniformity and at the same time does not appreciably interrupt the stream-line of the body.

The tank may, however, be mounted in such a manner that no straps are visible from the exterior of the vehicle. This preferred method of mounting is illustrated in Figs. 9, 10, and 11. In this instance the tank may be formed of two units 25 and 64 (Fig. 11) which are so welded together at 65 that the upper section of the tank overlaps the lower section and extends beyond the joining weld. A series of bars 66 are then secured to the extension of the upper section and bolts 67 passed through them and secured to the bolsters or cradles 68 supporting the tank. In this instance the mounting units are completely hidden from view by the apron 45 which may be formed integral with the upper portion of the tank or welded or otherwise secured thereto. A similar mounting may of course be used for the usual one-piece cylindrical tank in which case the apron 45 is welded to the tank shell 25 at, say, 65 and the bars 66 are then secured to the apron and bolted to the bolsters as previously described.

If instead of a single tank a plurality of individual containers are used, they may be mounted on the frame in such a manner that they are spaced from each other and from the control cab and the engine compartment. This spacing is maintained by metal straps 37–42 (Figs. 1 and 2) secured by welding or other means, to the peripheral edges of the containers and to the control cab and engine hood. The tank units are thus held in mutually spaced relation from each other and from the control cab and the engine hood.

In order to take care of any liquids which may be spilled or rain water which may collect in the various compartments formed by the false heads and the outer shell 25 (Figs. 7, 8, 9, and 12) of the tank truck, apertures 43 are provided in the ends of these compartments immediately above the floor 28. These apertures lead into the space between the double bulkheads 21, 22 or 23, 24 (Figs. 8 and 9) separating the tank compartments and several apertures 44 (Fig. 8) are provided in the lowest portion of the shell 25 between the bulkheads to permit the liquid to drain out onto the ground. The compartments formed by the false tops should, therefore, remain dry at all times.

The usual practice of carrying the outlet pipes from a sump in the middle of the compartment or container bottoms to an outlet box 73 mounted at the side of the vehicle has been modified by cutting away a portion of the shell of each tank or compartment, preferably of rectangular area and extending from the lowest portion of the tank 69 to a point 70 somewhat below the widest portion of the tank, and welding into this opening an extension 71 to the tank, of the general design illustrated in Figure 11. This extension carries the liquid contents of the tank into the outlet compartment from which they are passed by gravity to the outlet pipes through an opening in the sump 72 which is below the level of the lowest portion of the tank proper. The connections between the tanks and the outlet pipes are thus housed in the outlet box and the whole outlet system is therefore readily available for inspection or repair.

I have followed common practice in carrying the outlet pipes through a common meter to a hose outlet and in providing individual valves so that the contents of any particular tank may be passed to the common outlet and these features have therefore not been illustrated. The outlet box 73 is normally hidden by a flat apron 45 secured to and extending the length of the containers and from their widest portion to a point slightly below the axle level, as illustrated in Figures 1, 9, and 11. Doors 46, 47 are provided in this apron giving access to the valves and outlet pipes. The necessary lengths of hose for use in distributing the contents of the tanks may be carried in a space provided for the purpose in this outlet box.

A box 74 similar to the outlet box is provided on the opposite side of the body and may be utilized for transporting package goods or oil cans.

It may also be noted as an advantage of this invention, that in view of the fact that the controls are all pneumatically operated the driver's position in the control cab 9 may be arranged in any manner desired. That is, the controls may be placed in the direct center of the cab or at either side. The stream-line design used for the control cab adapts itself readily to the installation of a large number of windows 48 (Figs. 1, 2, 3, 9, and 10) surrounding practically the entire front and sides of the cab, thus giving the driver an unusually wide range of vision.

In the particular embodiment of the invention here disclosed, an internal combustion engine 19 is illustrated, but other types, such as the gas-electric power units, may also be readily adapted to such use.

As is shown in Figure 4 the longitudinal frame members 49 may be tapered or flared inward to the rear of the rear axle as at points 50 and 51, to conform to the body design, and the engine 19 supported between them on cross members such as 52 and 53 or, if preferred, it may be supported directly from the longitudinal members themselves as at 54 and 55. It will be noted from Figure 5, that the portion of the frame to the rear of the rear axle is maintained at its usual height.

In previous instances where the engine has been placed at the rear of the chassis it has frequently been mounted with the radiator to the rear of the vehicle, and the rear wheels have been driven by a propeller shaft carried from the engine to a point in front of the rear wheels and from there by a reverse drive and a second propeller shaft back to the axle. In other instances a specially designed frame has been utilized, which places the engine crank shaft on a level with the rear axle and in these cases a direct drive was utilized. In my disclosure the engine is placed in the normal position, that is with the radiator 56 in front and the transmission 57 in the rear.

At the rear of the transmission I have suspended a train of gears 58 housed in a casing formed integral with that of the transmission. The top gear in this train is operated directly from the transmission. The lowest gear in the train in turn operates through a universal joint 59 and a short drive shaft 60, located underneath the engine, to drive the axle 2 through the customary differential gears to operate the rear wheels. In the normal loaded condition of the vehicle, this drive shaft 60 is approximately parallel to the frame and on a level with the rear axle.

While the drive is here shown as applied to the rear wheels it may also be utilized in a similar manner to drive the front wheels of a vehicle where the engine is placed either above or forward of the front axle.

In the arrangement of the radiator 56 (Fig. 6) here disclosed it is, of course, directly back of the load carrying compartment 3, and in this position it would not receive a sufficient flow of air to permit it to properly perform its cooling duties. In order to assure the radiator of an adequate supply of air the portion of the tank or body immediately in front of the radiator has been indented or cut away in the general shape of a wedge, the narrow edge of which is parallel to the top of the radiator and the base of which is on a level with the frame, that is, a portion of the rear wall 61 of the tank or rear load compartment 3 has been sloped away from the radiator in a downwardly direction. Thus, any air entering this space will be directed against the radiator as indicated by the arrows in Figure 6. In the same way the load compartment may be sloped in such a manner that with the aid of entrance louvers air can be drawn from either or both sides of the vehicles or from the top.

In order to assure adequate air being forced into this space it may be necesary to utilize an apron 62 of metal or other suitable material. This apron should have a forward slope or curve and may be suspended from the frame or radiator shell, by means of a bracket 63 or otherwise, immediately under the front edge of the radiator in such a position that it will scoop air from under the vehicle when the vehicle is in motion and with the aid of the sloping wall 61 of the tank or rear load compartment will force the air to the radiator.

In order to adequately care for the cooling requirements of the motor the radiator used may be of a somewhat larger size than would be required if it were placed in front of the vehicle. Exit louvers 75 (Figs. 9 and 10) placed in the hood of the engine compartment aid materially in the circulation of the air. As previously pointed out, an opening may also be cut in the hood of the engine compartment under the cat-walk extension 34 and the latter may be hinged at its upper end, as at 76, and raised and locked in an open position by means of locking device 77, thus materially aiding in the cooling of the engine.

In the case of a vehicle having a drop frame, this method of passing air to the radiator may not be adequate, since the body is closer to the ground and in this case it may be necessary either to place louvers at the top or sides of the vehicle to pass air to the radiator or the radiator may be so placed in one of the walls of the hood that it is exposed to the air, a method which has frequently been used heretofore.

The engine compartment illustrated is of such a size that a man can stand upright in it and can thus work on the engine and transmission units with a minimum of effort. The engine may also be readily taken out for repair or replacement by removing the engine hood, or if desired the engine transmission and rear axle assembly may be quickly removed as a unit by jacking up the rear end of the frame, removing frame member 53 and disconnecting the shackles holding the rear springs and the bolts securing the engine to the frame. This is of particular advantage where the vehicle represents a considerable investment and it is desirable to keep it on the road as constantly as possible. It might be pointed out in this connection that by having a movable section of the engine hood, such as cat-walk section 34, both light and air may be furnished a person working on the engine.

This application is a division of my copending application Serial No. 699,495, filed November 24, 1933 for Stream-lined automotive vehicle.

I claim:

1. In an automotive tank truck, a liquid container, a false head in the container extending the length of the container, a manhole in the false head, a rectangular aperture in the shell of the container at least as large as the manhole and located above the manhole, a cover and filling cap mounted over the manhole of a combined height such that they will not extend beyond the shell of the container, a metal strip secured to each longitudinal edge of the aperture and extending the length of the container, and a metal cat-walk supported on said strips, the section of the cat-walk covering the aperture being hinged to one strip and supported by the other such strip and means for locking said hinged portion in place.

2. In an automotive tank truck, a liquid container, a false head placed inside of the container and parallel to the longitudinal axis thereof, supporting members for said false head formed by bending down sections of the container shell directly above the false head and securing them thereto, a manhole in the false head intermediate said supporting members, a cover mounted over said manhole of a height such that it does not extend beyond the shell of the container, and means for covering the aperture in the container shell resulting from the formation of said supporting members.

3. In an automotive tank truck a liquid container having a curved upper surface, a false head placed inside of the container and parallel to the longitudinal axis thereof, supporting members for said false head formed by bending down sections of the container shell directly above the false head and securing them thereto, a manhole in the false head intermediate said supporting members, a cover and filling cap mounted over the manhole and of a combined height such that they do not extend beyond the periphery of the container, a metal strip secured to each longitudinal edge of the aperture in the container and extending the length of the container, a metal cat-walk supported on said strips, the section of the cat-walk immediately above the aperture in the container being hinged to give access to the filling cap and means for locking said hinged portion in place.

4. In combination with a vehicle, a tank disposed longitudinally of the vehicle and having its interior divided into a series of compartments each having an upper opening, a closure cover for each of said openings, and means providing a walk above and normally concealing all of said covers, said walk means including local removable closure sections located over each cover.

5. In combination with a vehicle, a tank disposed longitudinally of the vehicle and having an upper opening, a closure cover for said opening, and means providing a walk extending throughout substantially the entire length of the tank above and normally concealing said cover, said walk means including a local removable closure located over said cover.

6. A vehicle tank structure, comprising an elongated substantially elliptical sectioned tank having a substantially horizontal upper bounding plate provided with an opening, a closure for said opening having mechanism projecting above said top plate, and a housing for said mechanism having an upper curved surface substantially following the contour of the side surface of said tank.

7. A vehicle tank structure, comprising an elongated substantially elliptical sectioned tank having an upper bounding plate provided with a manhole, a closure for said manhole projecting above said plate, and a laterally curved housing for said closure forming a walk extending longitudinally of the tank substantially from one end to the other thereof.

8. In combination with a vehicle, a tank disposed longitudinally of the vehicle and having its interior divided into a series of compartments each having an upper opening, a closure cover for each of said openings, and means providing a walk above and normally concealing all of said covers, said walk means comprising local closure plates hingedly connected to said tank adjacent to each of said covers.

9. In combination, a tank having a top plate providing a trough divided into a series of separate compartments extending along the top of the tank, said plate having a series of inlet openings therein, closure covers for said openings, and a continuous closure for said trough including a series of removable cover plates disposed above said closure covers.

10. In combination, a tank having a trough divided into a series of separate compartments extending along the top thereof, said trough having a series of inlet openings therein, closure covers for said openings, and a walk extending along said tank above said trough, said walk including local removable sections located over said covers.

11. In combination, a tank having a trough divided into a series of separate compartments extending along the top thereof, said trough having a series of openings therein, closure covers for said openings located within said trough, and local closure plates hingedly connected to said tank adjacent to each of said covers, said plates being swingable toward and away from said covers.

12. In combination with a vehicle, a tank disposed longitudinally of the vehicle and having an upper opening, a closure cover for said opening, and means providing a walk extending throughout substantially the entire length of the tank over and normally concealing said cover, said walk means comprising a local closure plate hingedly connected to said tank adjacent to said cover.

13. In combination with a vehicle, a liquid container having an aperture in the top thereof, a false head in the container, said head being provided with a manhole disposed beneath the aperture in the top of the container, a closure for said manhole, and a movable closure adapted to conform to the configuration of the container and hingedly secured thereto for closing said aperture and concealing said manhole and its closure.

HOWARD W. KIZER.